United States Patent

[11] 3,617,044

[72] Inventor Edward A. Strange
 Florence, Oreg.
[21] Appl. No. 860,891
[22] Filed Sept. 25, 1969
[45] Patented Nov. 2, 1971
[73] Assignee Frank V. Suniga
 Oakridge, Oreg.
 a part interest

[54] ELECTRICAL OUTLET BOX INSTALLATION TOOL
 1 Claim, 4 Drawing Figs.
[52] U.S. Cl. ................................................ 269/6,
 81/420, 269/282
[51] Int. Cl. ................................................ B25b 1/00
[50] Field of Search .......................................... 81/367–380,
 418, 420, 5.1, 424, 421, 422, 423,
 425; 140/103; 248/DIG. 6; 269/2, 6, 282

[56]  References Cited
 UNITED STATES PATENTS
 2,624,376 1/1953 Smith ............................ 140/103
 2,624,377 1/1953 Smith ............................ 140/103
 2,748,873 5/1956 Burke ........................... 81/418 X
 3,202,023 8/1965 Parker .......................... 81/421

Primary Examiner—William S. Lawson
Attorney—James D. Givnan, Jr.

ABSTRACT: A handtool with opposed movable jaws adapted to grip an electrical outlet box and position same in forwardly offset relationship to a wall stud for subsequent attachment thereto. A plate member carried by one of the jaws carries an adjustable guide bar to position the outlet box on the tool to accomplish the desired forward offset from the wall stud. The offset distance is to accommodate the thickness of wallboard to be applied to the wall stud. A portion of the plate member abuts the front surface of the wall stud for positioning in one vertical plane while the outlet box itself, securely held in the tool, abuts a side surface of the wall stud during attachment of the box to the stud.

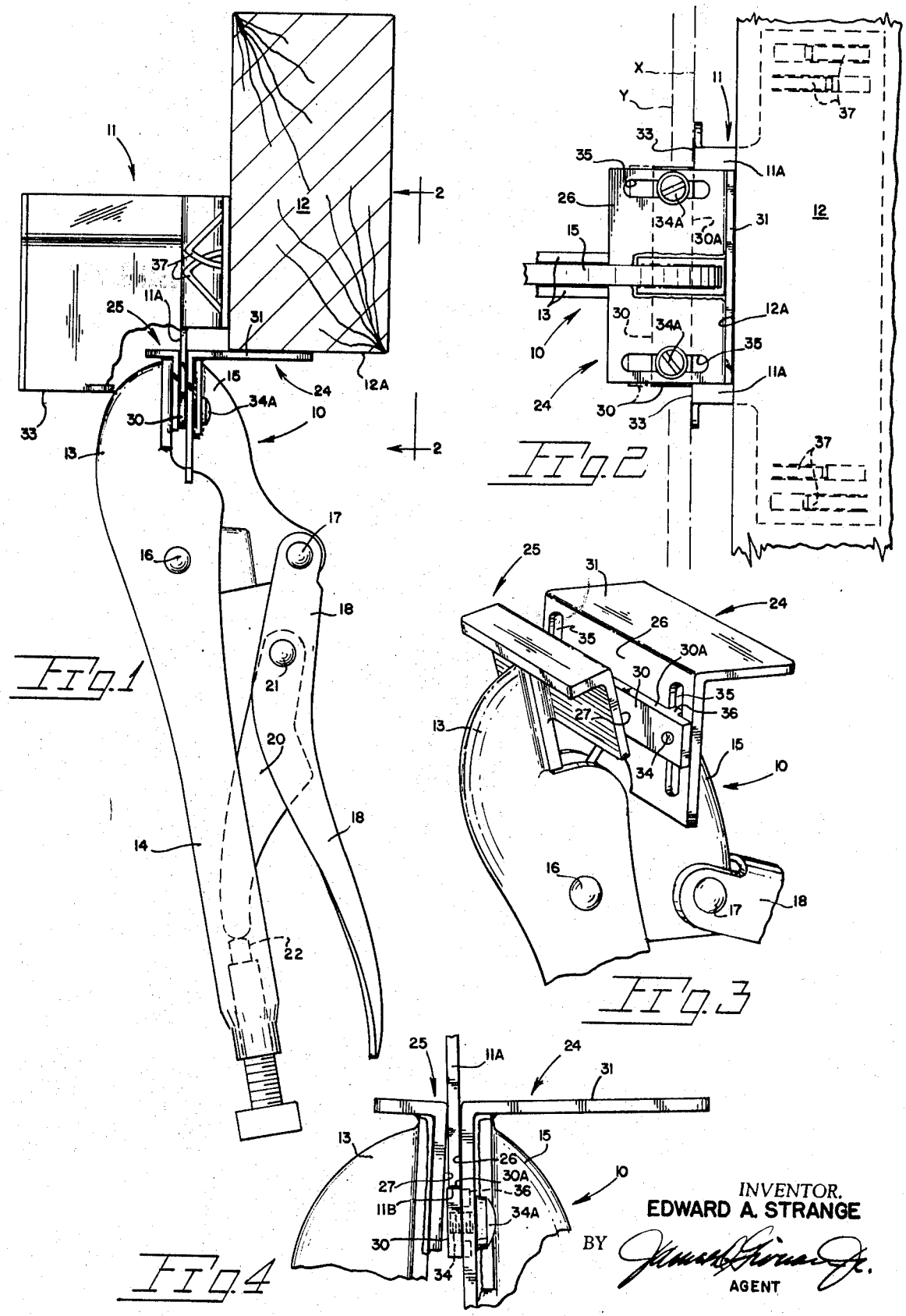

3,617,044

ELECTRICAL OUTLET BOX INSTALLATION TOOL

BACKGROUND OF THE INVENTION

The present invention relates generally to handtools and more particularly to a handtool for accurately positioning an electrical outlet box for attachment to a wall stud of a building.

Electrical outlet box installation conventionally includes the attachment of the metal or plastic boxlike structure eventually housing a switch or socket to a wall stud member during wall construction. In wooden frame construction, outlet boxes are commonly affixed to wall studding of a partially completed wall structure with the associated electrical conduits and switches or sockets being later installed therein prior to the completion of the wall.

Installation of the outlet box involves the offsetting of the box front edge or perimeter from the wall studding in order that the front edge will be substantially flush with the planar surface of the wall when applied. In addition to being forwardly offset from the studding the front edge of the box must be in parallel relationship with the stud in order that the cover plate may be properly mounted over the box and the bordering wallboard material.

Electrical outlet box manufacturers have to some extent recognized the problems of box installations and now stamp calibrated indices to assist in offsetting of the box. Premounted nails in the box or clips punched from the box also facilitate attachment but neither the premounted fasteners or stamped calibrations now available assure correct positioning of the box on the wall stud.

Another aspect to consider is the difficult working conditions under which outlet box installation is accomplished. For instance the lighting or visual conditions are usually poor in partially completed buildings. Further, electrical outlet boxes are often installed in corner areas of walls or down low adjacent the floor surface, all contributing to the difficult securing of the outlet box to a wall member. The installation even under ideal circumstances requires a great deal of care that both the required offset is provided for as well as the parallel relationship between wall stud and box is achieved.

The foregoing points out the need for a tool of the present type which permits uniform outlet box attachment with a much greater accuracy and at a more efficient rate. Further the tool readily lends itself by means of an adjustable feature, for use in offsetting the outlet boxes the specific distance required as determined by the thickness of wall-siding material used. Further the outlet box is securely positioned against the stud during installation. Commonly this siding thickness will range between one-quarter and three-quarters of an inch requiring a like forward offset in the outlet box front edge.

DESCRIPTION OF THE DRAWING

In the accompanying drawing:

FIG. 1 is a plan view of the present tool operatively holding an outlet box against a sectioned wall stud, FIG. 2 is a side elevational view of the tool's forward end taken along line 2—2 of FIG. 1, FIG. 3 is a perspective view of the tool's forward end showing the jaws of the same disposed preparatory to gripping an outlet box, and FIG. 4 is an enlarged detailed view of the tool's jaw elements and a fragment of an outlet box.

DESCRIPTION OF THE PREFERRED EMBODIMENTS

With continuing reference to the drawing wherein applied reference numerals identify parts similarly identified in the following specification, the reference numeral 10 indicates generally a handtool embodying the present invention. For purposes of illustrating the tool's function, an outlet box generally at 11, is shown for attachment to the wall stud member at 12.

The handtool 10 is of the plier type having a fixed jaw 13 integral with an elongate handgrip 14 while a movable jaw 15 pivots about a hinge pin 16 interconnecting the jaw members. Linked by a second hinge pin at 17 to jaw 15 is an operating lever 18. An overcenter-locking arrangement is provided by a link 20 pivotally carried by a pivot pin 21 by lever 18 with the opposite end of the link 20 abutting an adjustable stop 22. Accordingly upon positioning of the inner end of the stop 22 a fulcrum is thereat provided for the inward swinging of link 20. Upon closing of the operating lever 18 toward handgrip 14 the pivot pin 21 will pass overcenter past an imaginary line between hinge pin 17 and the abutting ends of link 20 and stop 22. Hence depending on the location of stop 22 an overcenter lock for the movable jaw 15 may be established throughout a range of jaw positions to enable a sustained gripping action to be exerted on a jaw-held article without continued manual pressure being required. The foregoing handtool structure is well known and is marketed under the trademark Vise Grip.

The overcenter-locking feature of the above tool securely retains an article between the jaws thereof until jaw-opening movement is achieved by forceful movement of lever 18 away from handgrip 14.

The present invention resides in the following described structure in novel combination with the above-mentioned tool to constitute a very useful tool capable of performing functions heretofore not attainable with existing tools.

Oppositely secured to the existing jaws of the handtool 10 are first and second right-angular plate members generally at 24 and 25 adapted to be urged into gripping contact with outlet box 11.

Each plate member 24–25 includes flat surface portions respectively at 26 and 27 contactible oppositely in a gripping manner with a wall 11A of outlet box 11. The plate members are disposed medially on their supporting jaw members with the surfaces 26–27 being normal to the arcuate path of jaw movement. Each plate member 24–25 is of a length to provide adequate surface contact with outlet box wall 11A for desired frictional contact.

Positionably carried on the plate member 25 is a guide bar 30 against which the front edge 11B (FIG. 4) of the outlet box wall 11A is placed. The guide bar 30 and particularly its edge 30A thereon is adapted for slidable movement on planar surface 26 with the edge 30A retaining a parallel offset relationship with a remaining portion at 31 of the angular plate member 24. As shown in FIG. 1, portion 31 is adapted for placement against the front face of a wall stud, indicated at 12A, whereby the aforementioned relationship will insure the front perimeter 33 of the outlet box being in a vertical plane parallel to the front face of the stud.

To achieve the desired forward offsetting of the frontal perimeter 33 of the outlet box the guide bar 30, as aforesaid, is positionable and lockable at selected distances from the right-angular plate portion 31 as is best illustrated in FIG. 2. Wallboard, or other siding material, is manufactured in various thicknesses, thus the guide 30 and subsequently its box contacting edge 30A may be located along the surface 26 to encompass the range of wallboard thicknesses. By way of example wallboards of different thickness are indicated in broken lines at X and Y.

Fastening means for securely locking guide bar 30 to the flat surface portion 26 are provided in the form of machine screws 34 in threaded engagement with the bar. The shanks of the screws pass through elongate slots at 35 to permit the above-described adjustment with the heads 34A, of the screws extending beyond the slot opening for bearing contact to lock to the plate. To insure the maintaining of a parallel relationship between the guide bar edge 30A and plate portion 31 projections 36 may be provided on bar 30 slidably occupying the width of the slot opening.

In operation of the tool the guide 30 is positioned and locked in place a distance from the right-angular portion 31 depending upon the thickness of the wallboard to be applied. The jaws and of course the attached plate numbers 24–25 are opened to admit the placement of the front edge 11B of the outlet box wall 11A against guide bar edge 30A. The stop 22 of the tool is adjusted to provide the desired overcenter-locking feature whereby successive outlet boxes may be securely gripped while being installed.

The angular plate portion 31 is then placed into abutting contact with the face 12A of the stud while simultaneously a lateral force is exerted to firmly place the outlet box against the side of the stud 12. In the type of outlet box shown preformed fasteners in the form of clips 37, formed from the box, are driven into engagement with the stud by hammer blows. Other outlet boxes currently in use as aforesaid incorporate preinstalled fasteners to facilitate stud attachment.

What I claim and desire to secure by Letters Patent is:

1. In combination with a plier-type tool having opposing jaws and locking means for retaining the jaws in clamped relationship, the improvement providing a tool for holding an electrical outlet box in a forwardly offset relationship to a wall stud to facilitate securement of the outlet box thereto, the improvement comprising, a first plate member of right-angular configuration affixed crosswise to one of the tool's jaws and having first and second perpendicularly orientated portions, said first portion forwardly offset from the jaw and adapted to abut a wall stud to which an electrical outlet box is to be installed, said second portion adapted for clamping engagement against the outlet box to be installed and defining a pair of parallel slotted areas, a second plate member affixed in a crosswise manner to the other jaw of the tool, a guide bar adjustably carried by said second portion of the first plate member and having a pair of projections slidably carried in said slotted areas, means carried by said projections for locking said guide bar to said second portion at a selected distance from said first portion of the first plate member with said projections retaining the guide bar at all times in parallel-spaced relationship to said first portion, and said first and second plate members adapted to be clamped and locked to opposite sides of a wall of an electrical outlet box with a forward edge of said box bearing against said guide bar with the setting of said bar thereby determining the forward offset of the outlet box from the wall stud when said first portion of the plate member is in abutment with the wall stud, said jaws of the tool securely clamping the outlet box to facilitate positioning of the box during its attachment to the wall stud.